(12) United States Patent
Li et al.

(10) Patent No.: US 8,785,898 B2
(45) Date of Patent: Jul. 22, 2014

(54) DEVICE AND METHOD FOR DETECTING LIQUID LEVEL OF MOLTEN SILICON USING LASER REFLECTED FROM CURVED MIRROR

(75) Inventors: Qi Li, Xi'an Shaanxi (CN); Nianlong Song, Xi'an Shaanxi (CN); Ding Liu, Xi'an Shaanxi (CN)

(73) Assignee: Xi'an University of Technology, Xi'an Shaanxi (CN)

( * ) Notice: Subject to any disclaimer, the term of this patent is extended or adjusted under 35 U.S.C. 154(b) by 813 days.

(21) Appl. No.: 12/951,578

(22) Filed: Nov. 22, 2010

(65) Prior Publication Data

US 2012/0025112 A1 Feb. 2, 2012

(30) Foreign Application Priority Data

Jul. 30, 2010 (CN) .......................... 2010 1 0246742

(51) Int. Cl.
*G01N 15/06* (2006.01)
*H01L 27/00* (2006.01)

(52) U.S. Cl.
USPC ....................................... 250/573; 250/208.1

(58) Field of Classification Search
CPC .............. G01F 23/292; G01F 23/2925; G01F 23/2927; G01F 23/02; G01F 23/2922
USPC ......... 250/221, 238, 227.25, 208.1, 573–577, 250/900–908; 116/109; 137/386, 392; 340/618, 619; 73/290 R, 291
See application file for complete search history.

(56) References Cited

U.S. PATENT DOCUMENTS

| | | | | |
|---|---|---|---|---|
| 4,524,282 A | * | 6/1985 | King | 250/577 |
| 5,604,301 A | * | 2/1997 | Mountford et al. | 73/54.31 |
| 7,758,696 B2 | * | 7/2010 | Stoddard et al. | 117/52 |
| 2006/0199307 A1 | * | 9/2006 | Tsai et al. | 438/109 |
| 2008/0100839 A1 | * | 5/2008 | Fouquet | 356/328 |

FOREIGN PATENT DOCUMENTS

| | | | | |
|---|---|---|---|---|
| JP | 63-179240 | * | 7/1988 | G01N 21/47 |
| JP | 07-140298 | * | 6/1995 | G21F 9/16 |

* cited by examiner

*Primary Examiner* — Pascal M Bui Pho
(74) *Attorney, Agent, or Firm* — NSIP Law

(57) ABSTRACT

A laser liquid level detection device is provided with linear optical magnification of a curved minor. The device includes a laser device, a CCD detecting device having a curved mirror and a CCD sensor and signal processing devices disposed in the laser device and the CCD detecting device. The laser device emits a laser beam to a surface level of a liquid, which reflects the beam to the CCD detecting device, and the curved mirror directs the reflected beam onto the CCD sensor. The shape of the curved mirror is determined by a polynomial curve function so as to linearly magnify a change in a height of the surface when the bounced beam reaches the CCD sensor. The liquid level detection device enables the position of the surface level of the liquid to be detectable in real time with high accuracy.

4 Claims, 4 Drawing Sheets

DEVICE AND METHOD FOR DETECTING LIQUID LEVEL OF MOLTEN SILICON USING LASER REFLECTED FROM CURVED MIRROR

CROSS-REFERENCE TO RELATED APPLICATION(S)

This application claims the benefit under 35 U.S.C. §119 (a) of Chinese Patent Application No. 201010246742.4, filed on Jul. 30, 2010, in the State Intellectual Property Office of the People's Republic of China, the entire disclosure of which is incorporated herein by reference for all purposes.

FIELD OF THE INVENTION

The present invention belongs to the technical field of detection technology and automatic equipment, and relates to a device for detecting a liquid level of melted silicon using a laser reflected from a curved mirror. The present invention also relates to a method for performing a liquid level detection of melted silicon using a laser reflected from a curved minor, for a liquid surface detection of a single crystal furnace.

DESCRIPTION OF RELATED ART

Recently, during a liquid level detection of melted silicon using an oblique incidence and oblique reception type Laser Triangulation Method, due to the limitations of the special internal and external structures of the single crystal furnace and the requirement of the crystal pulling process, a distance between a position of a laser incident point and a photodetector is small, and a vertical distance between the horizontal plane where the laser incident point is located and the liquid surface is large. A laser is incident from the incident point, enters into the photodetector after being reflected from a liquid surface of molten silicon, and then is reflected to a sensor by a flat mirror within the photodetector. When the liquid level of the liquid surface of molten silicon is slightly changed, the change in the displacement of a spot, which is displayed on the sensor after the laser is reflected from the flat minor within the photodetector, is identical with the change in the height of the liquid level, such that the change in the displacement of the spot reflected onto the sensor is small, causing a low resolution of the liquid level detection and a low detection accuracy.

In a light path of a laser triangulation liquid level detection system, if a flat minor is used to change a light path of a light reflected by the liquid surface, it is impossible to magnify the slight change in the liquid level as the change in the displacement of the spot on the detector; and if a cylindrical mirror is used to change the path of the light reflected by the liquid surface, it is possible to magnify the slight change in the liquid level as the change in the displacement of the spot on the sensor, but such magnification is nonlinear, and thus the change in the spot position cannot directly reflect the change in the position of the liquid surface.

SUMMARY OF THE INVENTION

An object of the present invention is to provide a device for detecting a liquid level of melted silicon using a laser reflected from a curved mirror with improved accuracy of detecting the liquid surface of melted silicon.

Another object of the present invention is to provide a method of detecting a liquid level of melted silicon using a laser reflected from a curved minor.

A technical solution adopted by the present invention is a device for detecting a liquid level of melted silicon using a laser reflected from a curved mirror, comprises two openings disposed at a top of a single crystal furnace symmetrically, gold-plated quartz glasses disposed at the two openings, a laser device and a CCD detecting device respectively disposed corresponding to the two openings, and signal processing devices disposed within the laser device and the CCD detecting device;

the CCD detecting device has a structure comprising: a detecting device housing, an optical filter horizontally disposed at a bottom of the detecting device housing, a driving board vertically disposed at an inner wall of the detecting device housing, a CCD sensor vertically disposed at an inner side of the driving board, a curved minor having a concave reflective surface disposed within the detecting device housing, and a connector disposed at a top of the detecting device housing, wherein the reflective surface of the curved mirror is disposed obliquely, the reflective surface faces the optical filter and the CCD sensor;

the laser device has a structure comprising: a laser device housing, a laser disposed within the laser device housing, and a temperature control device disposed at an outer surface of the laser, a control circuit board to which the laser and the temperature control device are respectively connected, and an electrical connector and a cooling air port respectively disposed at a top of the laser device housing;

the signal processing device has a structure comprising: a laser driving circuit, a laser temperature control circuit, and a microprocessor a disposed within the laser device, and a CCD driving circuit, an image signal processing circuit, and a microprocessor b disposed within the laser device, wherein the laser device and the CCD detecting device are respectively connected to an RS485 bus.

Another technical solution adopted by the present invention is a method for detecting a liquid level of melted silicon using a laser reflected from a curved mirror, comprising the specific steps of:

Step 1 disposing two openings at a top of a single crystal furnace symmetrically, installing gold-plated quartz glasses installed at the two openings, disposing a laser device and a CCD detecting device in which a curved mirror is not installed respectively disposed at positions corresponding to the two openings, wherein signal processing devices are pre-disposed within the laser device and the CCD detecting device, wherein the signal processing device has a structure comprising: a laser driving circuit, a laser temperature control circuit, and a microprocessor a disposed within the laser device, and a CCD driving circuit, an image signal processing circuit, and a microprocessor b disposed within the laser device, wherein the laser device and the CCD detecting device are respectively connected to an RS485 bus;

Step 2 determining a shape of a reflective surface of the curved minor and a position of the curved minor within the CCD detecting device, which comprising the specific processes as follows a laser path formed by laser incident from an incident point of the laser device is mapped to a corresponding two-dimensional coordinate system, it is assumed that the curved mirror is disposed within the CCD detecting device, a reflective surface of the curved minor is disposed obliquely, the reflective surface faces an optical filer and a CCD sensor, and the laser is reflected by the curved mirror after being reflected from a liquid surface of melted silicon, in the established coordinate system, the laser path is analyzed, wherein the laser is emitted from a laser incident point, a horizontal plane between the laser incident point and a bottom of the CCD detecting device is set as an x-axis, a coordinate of the laser incident point is set as $A(-m_0,0)$, an angle formed by the laser incident point and the x-axis is set as $\beta$, when the emitted laser reaches a lowermost end of the reflective surface of the curved minor after being reflected from the liquid surface of melted silicon liquid, an intersection point of the laser reflected from the liquid surface of melted silicon and the x-axis is set as $A_1(m_0,0)$, an axis vertically passing through a midpoint of $A(-m_0,0)$ and $A_1(m_0,0)$ is set as a y-axis, a current distance between the x-axis and the liquid surface of melted silicon is set as $d_0$, and a current height of the liquid surface of the melted silicon is a maximum measurable value; when the height of the liquid surface of melted silicon decreases and the emitted laser reaches an uppermost end of the reflective surface of the curved mirror after being reflected from the liquid surface of melted silicon, a current height of the liquid surface of melted silicon is a minimum measurable value, and a difference between the maximum value and the minimum value of the height of the liquid surface of melted silicon is the detectable range r; when the height of the liquid surface of molten silicon is changed from high to low, reflecting points of the laser on the liquid surface of melted silicon are set as $V_0(T_0,D_0), V_1(T_1,D_1), \ldots, V_i(T_i,D_i)$ in sequence and the lines formed by the reflection of the liquid surface of melted silicon are set as $f_0, f_1, \ldots, f_i$ in sequence, a curve function of the reflective surface of the curved mirror is set as $y=f(x)$, reflecting points on the curved minor are set as $C_0(x_0,y_0)$, $C_1(x_1,y_1), \ldots, C_i(x_i,y_i)$ in sequence, lines formed by the reflection of the curved mirror are set as $f_0', f_1', \ldots, f_i'$ in sequence, angles formed by $f_0', f_1', \ldots, f_i'$ and the x-axis are set as $\alpha_0, \alpha_1, \ldots, \alpha_i$ in sequence, and a reflection tangent line of $f_i$ and $f_i'$ at the point $C_i(x_i,y_i)$ is set as $l_i$, the laser is finally incident to the CCD sensor which is disposed vertically, a line representing the CCD sensor is $x=L+m_0$, and incident points on the CCD sensor are set as $P_0(L+m_0,Q_0)$, $P_1(L+m_0,Q_1), \ldots, P_i(L+m_0,Q_i)$ in sequence, calculating discrete points $C_i(x_i,y_i)$ on the curve of the curved mirror, which comprising first $l_0$ is obtained using $f_0$ and $f_0'$ according to the optical reflection principle, wherein $V_0(T_0,D_0)$ on $l_0$ and an angle $\beta$ are known, therefore the function of $f_0$ is known, and $C_0(x_0, y_0)$ and $P_0(L+m_0,Q_0)$ are determined; the reflection tangent line $l_0$ at the intersection point $C_0(x_0,y_0)$ is obtained according to the incident line $f_0$ and the reflected line $f_0'$; $C_1(x_1,y_1)$ is obtained through $C_0(x_0,y_0)$ by calculating the point $P_1(L+m_0, Q_1)$ on the CCD sensor when the liquid surface moves downwards by a distance d, that is, the reflecting point of the liquid surface is changed to be $V_1(T_1,D_1)$, the point $P_1(L+m_0,Q_1)$ on the CCD sensor is determined, the intersection point $C_1(x_1, y_1)$ of $l_0$ and $f_1$ is obtained, the line $f_1'$ is obtained using the points $C_1(x_1,y_1)$ and $P_1(L+m_0,Q_1)$, and then the reflection tangent line $l_1$ at the intersection point $C_1(x_1,y_1)$ of lines $f_1$ and $f_1'$ is obtained using lines $f_1$ and $f_1'$ according to the optical reflection principle, so that $C_1(x_1,y_1)$ is calculated based on $C_0(x_0,y_0)$; the line $f_i'$ is obtained using the points $C_i(x_i,y_i)$, which is an intersection point of $l_{i-1}$ and $f_i$, and $P_i(L+m_0,Q_i)$, and then the line $l_i$ is obtained using $f_i$ and $f_i'$ according to the optical reflection principle, using iterative method until all the discrete data points $C_i(x_i,y_i)$ are obtained, wherein i=0, 1, 2, \ldots, n, polynomial curve fitting using the obtained discrete data points $C_i(x_i,y_i)$, which comprising an M-order polynomial curve fitting is performed using the discrete data points $C_i(x_i,y_i)$ obtained by the above calculation, wherein the fitted polynomial curve of the curved mirror is as follows:

$$y=f(x)=\alpha_M x^M+\alpha_{M-1}x^{M-1}+\ldots+\alpha_0$$

wherein x is a value selected from a range $(x_0,x_n)$, M is a value selected from a range 3-5, and $\alpha_0, \alpha_1, \ldots, \alpha_M$ are the parameters given by the least squares curve fitting algorithm;

Step 3 preparing the curved mirror according to the polynomial curve function of the curved minor calculated in step 2, such that a radian function of the reflective surface of the curved mirror is consistent with the polynomial curve function of the curved mirror, next, disposing the curved minor within the CCD detecting device, such that the reflective surface of the curved minor is disposed obliquely, and the reflective surface faces the optical filter and the CCD sensor, wherein the position of the curved mirror within the CCD detecting device is determined by the values defined by the polynomial curve function of the curved minor obtained as above;

Step 4 detecting a change in the height of the liquid surface of melted silicon, comprising: activating the laser device, emitting the laser from the laser incident point of the laser device towards the liquid surface of melted silicon, detecting the change in the height of the liquid surface of melted silicon by the CCD sensor when the laser enters into the CCD detecting device after being reflecting from the liquid surface of melted silicon, wherein the maximum variable range r of the height of the melted silicon liquid surface is known and the maximum measureable range R of a spot on the CCD sensor is known, therefore, the magnification of the curved mirror 11 is obtained as N=R/r, the spot on the CCD sensor is changed as the liquid level of the liquid surface of melted silicon is changed, the changed value of the height of the spot on the CCD sensor is recorded, and then is divided by the magnification N, and therefore, the changed value of the height of the liquid surface of melted silicon is obtained.

The advantageous technical effects of the present invention are as follows: the position of the liquid surface of the single crystal furnace can be detected in real time; when the liquid surface of melted silicon is slightly changed, a large displacement occurs between the incident position (after the laser beam is reflected by the concave surface of the curved mirror 11) and the former incident position on the CCD sensor, such that the technical problem in the related art of a low optical resolution due to the structure of the conventional detecting device is solved, and therefore the detection accuracy is improved and the reading and writing of the signal is facilitated, with the advantages of high accuracy, short time for detection, low failure rate, and easy installation and operation. A curved minor is provided such that a slight change in a liquid level is linearly magnified as a change in a displacement of a spot on a detector, while a numerical algorithm for the function of the curved mirror is given. The detecting method may also be applied in the detection field requiring the magnification of a slight displacement with linear spot position indicating.

IN THE FIGURES:

1. liquid surface of molten silicon; 2. laser beam; 3. laser device; 4. CCD detecting device; 5. gold-plated quartz glass; 6. single crystal furnace; 7. crucible; 8, crucible lifting device; 9. optical filter; 10. connector; 11. curved mirror; 12. CCD sensor; 13. driving board; 14, temperature control device; 15. laser; 16. electrical connector; 17. cooling air port; 18. control circuit board; 19. power source; 20. laser driving circuit; 21. laser temperature control circuit; 22. microprocessor a; 23. CCD driving circuit; 24. image signal processing circuit; 25. RS485 bus; 26. power line; and 27. microprocessor b.

DETAILED DESCRIPTION OF THE PREFERRED EMBODIMENTS

Hereinafter, the present invention is described in details in connection with the drawings and the specific embodiments.

Figure 1:
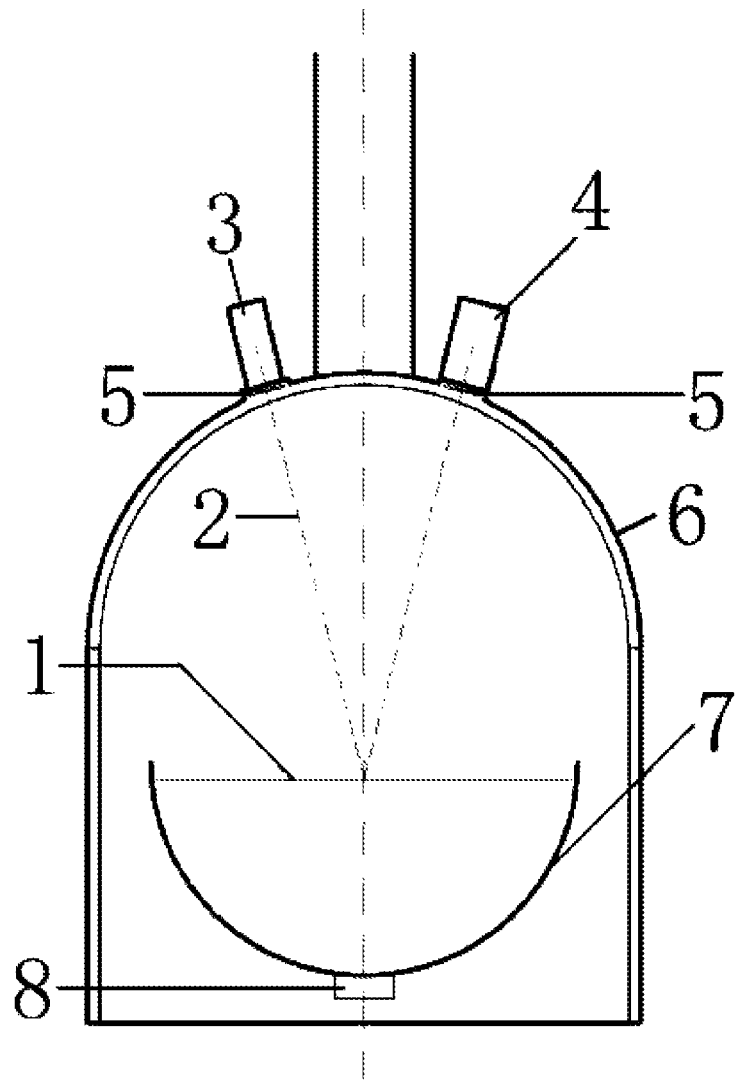
FIG. 1 is a structure diagram of a device for detecting a liquid level of molten silicon of the present invention.

The present invention adopts a structure of a laser liquid surface detection device with linear optical magnification of a curved minor. FIG. 1 shows the mechanical portions of the laser liquid surface detection device, wherein a crucible 7 is disposed within a single crystal furnace 6, a crucible lifting device 8 is at a lower end of the crucible 7, openings are formed at the both sides of the top end of the single crystal furnace 6 symmetrically, gold-plated quartz glasses 5 are disposed at the two openings, a laser device 3 and a CCD detecting device 4 are disposed corresponding to the locations of the two openings, respectively, and signal processing devices are disposed within the laser device 3 and the CCD detecting device 4.

Figure 2:
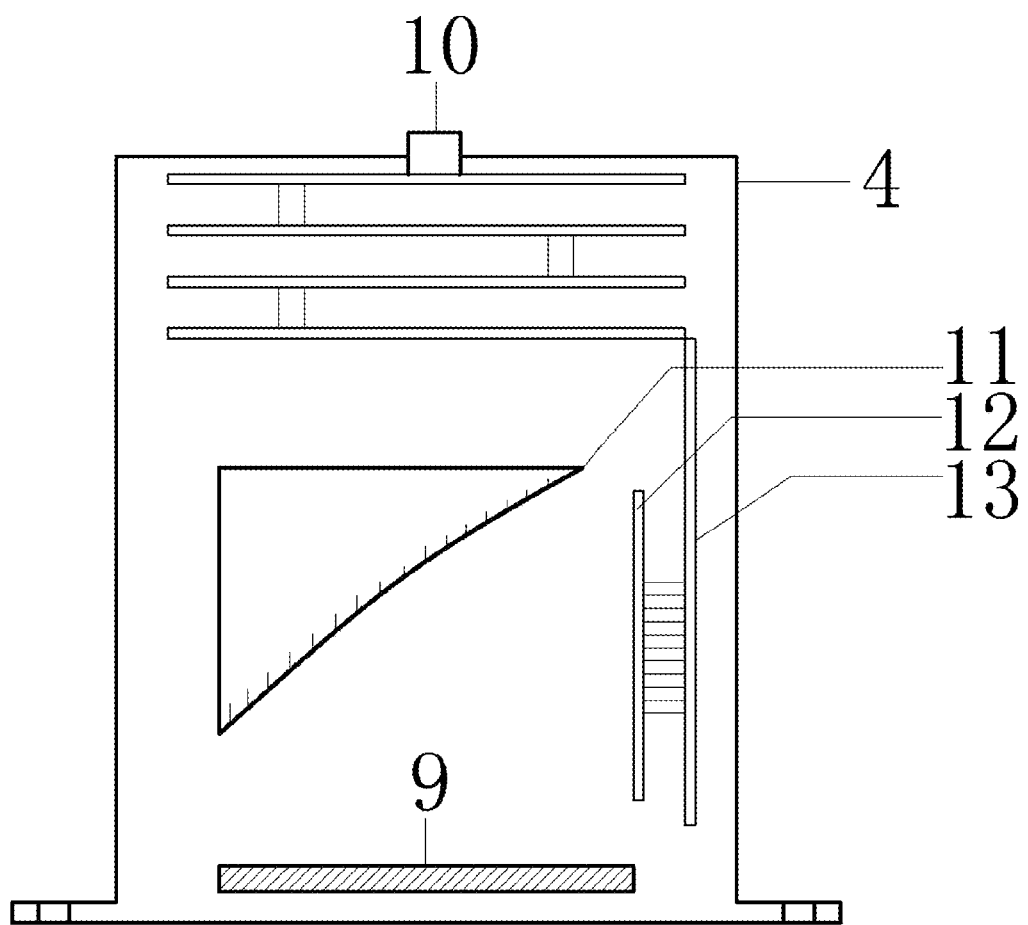
FIG. 2 is a structure diagram of a CCD detecting device in the device for detecting a liquid level of molten silicon of the present invention.

The structure of the CCD detecting device 4 is shown in FIG. 2, wherein an optical filter 9 is horizontally disposed at a bottom of a housing of the CCD detecting device 4, a driving board 13 is vertically disposed at an inner wall of the CCD detecting device 4, a CCD sensor 12 is vertically disposed at an inner side of the driving board 13, a curved minor 11 having a concave reflective surface is also disposed within the CCD detecting device 4, an emitting surface of the curved mirror 11 is disposed obliquely, facing the optical filter 9 and the CCD sensor 12, and a connector 10, which is connected to external circuits, is disposed at a top of the CCD detecting device 4.

Figure 3:
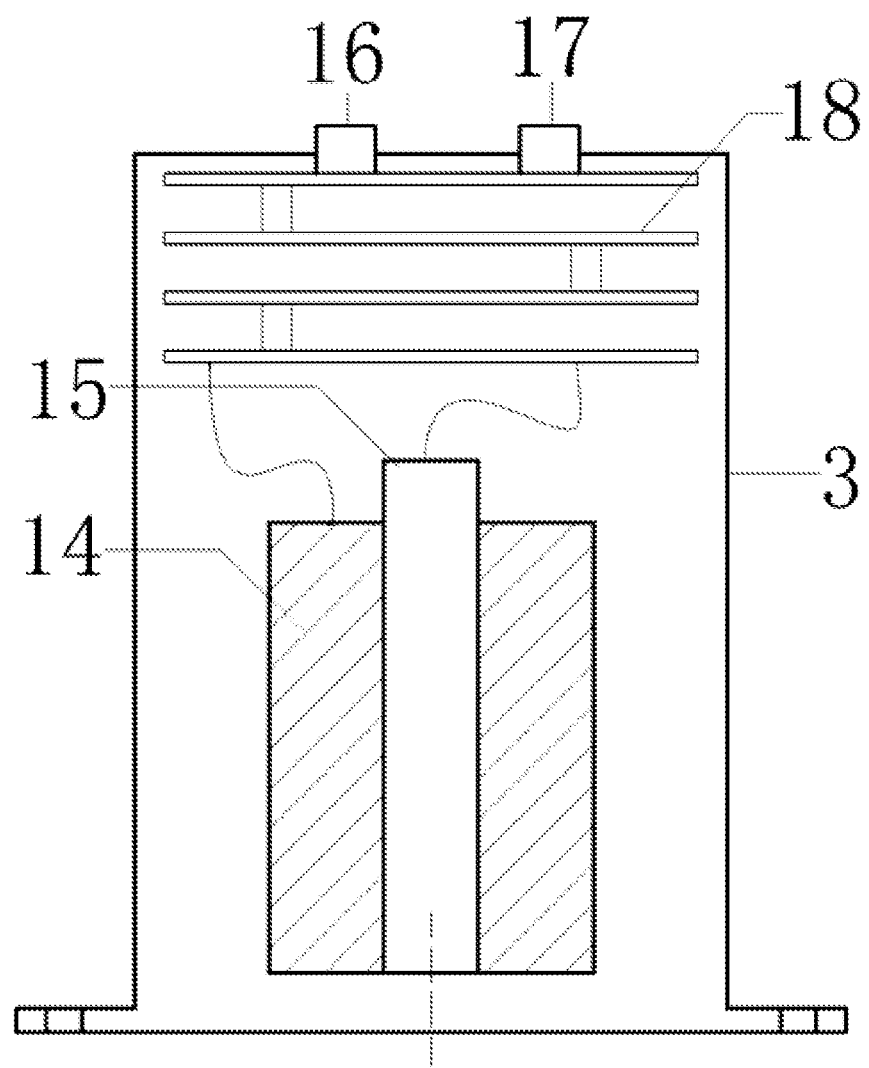
FIG. 3 is a structure diagram of a laser device in the device for detecting a liquid level of molten silicon of the present invention.

The structure of the laser device 3 is shown in FIG. 3, wherein a laser 15 is disposed within a housing of the laser device 3, a temperature control device 14 is disposed at an outer surface of the laser 15, the laser 15 and the temperature control device 14 are respectively connected to a control circuit board 18, and an electrical connector 16, which is connected to external circuits, and a cooling air port 17 are respectively disposed at a top of the housing of the laser device 3.

Figure 4:
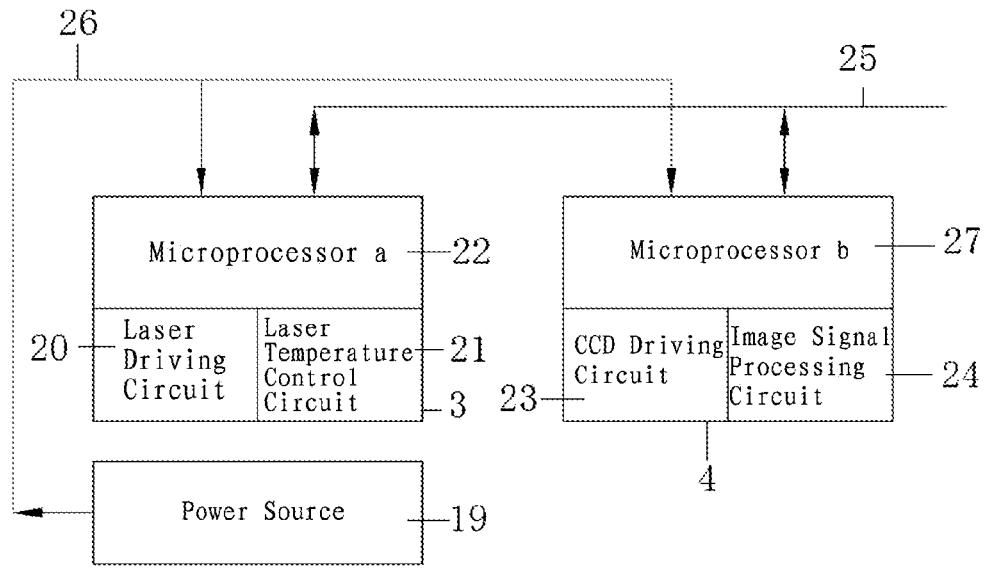
FIG. 4 is a block diagram of a signal processing device in the device for detecting a liquid level of molten silicon of the present invention.

The block diagram of the signal processing device in the device for detecting a liquid level of molten silicon using a laser reflected from a curved minor adopted by the present invention is shown in FIG. 4 as a signal processing portion, which comprises a power source 19, wherein the power source 19 is connected to the laser device 3 and the CCD detecting device 4 via power lines 26, respectively, an RS485 bus 25 is also connected to the laser device 3 and the CCD detecting device 4, respectively. The laser device 3 includes a laser driving circuit 20, a laser temperature control circuit 21, and a microprocessor a 22, and the CCD detecting device 4 includes a CCD driving circuit 23, an image signal processing circuit 24, and a microprocessor b 27. In particular, the microprocessor a 22 and the microprocessor b 27 are respectively coupled to the RS485 bus 25. The laser driving circuit 20 is used to drive the laser 15, the laser temperature control circuit 21 is used to control the temperature control device 14, the CCD driving circuit 23 is used to drive the CCD sensor 12, and the image signal processing circuit is used to process the signals passing through the driving board 13.

The working principle of the device for detecting a liquid level of molten silicon using a laser reflected from a curved mirror adopted by the present invention is described as follows. Molten silicon liquid to be detected is disposed within the crucible 7, and the crucible lifting device 8 is used to adjust the up and down positions of the crucible 7 within the single crystal furnace 6. The laser 15 and the temperature control device 14 are controlled by the control circuit board 18. When the temperature of the laser 15 is excessively high, cool air passes through the cooling air port 17, and then enters into the laser device 3 to lower the temperature. The laser 15 emits laser beam 2, and the laser beam 2 passes through the gold-plated quartz glass 5, and then is reflected by the liquid surface of molten silicon 1, and finally enters into the CCD detecting device 4, such that a basic Laser Triangulation Method is performed. The laser beam 2 entered into the CCD detecting device 4 is first filtered by the optical filter 9, so as to remove the light with different spectrum from the spectrum of the laser beam, preventing the interference on the CCD sensor 12 of other light sources, and then the laser beam 2 is reflected by the curved mirror 11 to the CCD sensor 12. The signals output by the CCD sensor 12 are processed by the driving board 13, and then transmitted through the connector 10 as detection signals. When the liquid surface of molten silicon 1 is slightly changed, the laser beam 2 is reflected by the concave surface of the curved minor 11, and thus a large displacement occurs between the current incident position and the former incident position on the CCD sensor 12, such that the detection accuracy is improved and the reading and writing of the signal is facilitated.

The laser liquid surface detection device of the present invention is suitable for a liquid surface detection of molten silicon of a straight pulling type single crystal furnace. The laser liquid surface detection device of the present invention has a good function of linear magnification, which may magnify a slight change in the displacement of the liquid surface as a change in the displacement of a spot on the photodetector, resulting in high accuracy, short time for detection, low failure rate, easy installation and operation. The CCD detecting device of the laser liquid surface detection device of the present invention may also be used in general spot position indicating systems, so as to obtain a position indicating device with the function of linear magnification.

In the present invention, the curved mirror is a cylindrical surface minor having a specific function relationship. The function relationship ensures that the corresponding relationship between the change in the liquid surface of molten silicon and the position obtained on the CCD sensor is linear. In order to obtain the linear corresponding relationship, the present invention provides a method for detecting a position of a liquid surface using the above laser liquid surface detection device with the specific steps as follows.

Step 1

Two openings are disposed at the top of the single crystal furnace 6 symmetrically. Gold-plated quartz glasses 5 are installed at the two openings. The laser device 3 and the CCD detecting device 4, in which the curved mirror 11 is not installed, are respectively disposed at the positions corresponding to the two openings. The signal processing devices are pre-disposed in the laser device 3 and the CCD detecting device 4. The structures of the laser device 3, the CCD detecting device 4, and the signal processing device are identical with those in the laser liquid surface detection device using the linear optical magnification of the curved mirror of the present invention.

Step 2

The shape of the reflective surface of the curved minor 11 and the position of the curved minor 11 within the CCD detecting device 4 are determined as follows.

Figure 5:
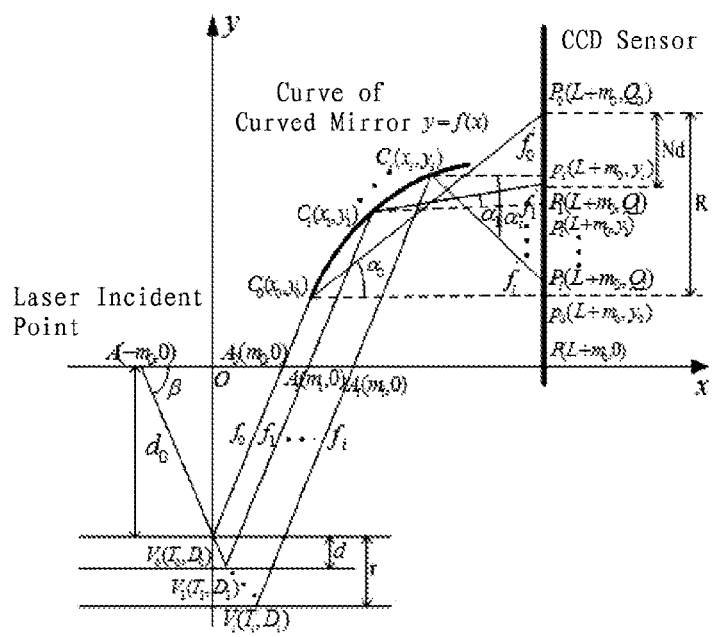
FIG. 5 is a schematic diagram of a linear magnification of a curved minor in the method of the present invention.

First, the laser path formed by the laser incident from the incident point of the laser device 3 is mapped to a corresponding two-dimensional coordinate system. In the established coordinate system, the laser is reflected by an assumed curved minor 11 after being reflected from the liquid surface of molten silicon, and the path of the laser is analyzed. The principle of linear magnification of the curved mirror is shown in FIG. 5.

The laser is emitted from the laser incident point of the laser 15. A horizontal plane between the laser incident point A and the bottom of the CCD detecting device 4 is set as the x-axis, the coordinate of the laser incident point is set as $A(-m_0,0)$, and the angle formed by the point A and the x-axis is set as $\beta$. When the emitted laser reaches the lowermost end of the reflective surface of the curved mirror 11 after being reflected from the liquid surface of molten silicon liquid, the intersection point of the laser reflected from the liquid surface of molten silicon and the x-axis is set as $A_1(m_0,0)$. The axis vertically passing through the midpoint of $A(-m_0,0)$ and $A_1(m_0,0)$ is set as the y-axis. At this time, the distance between the x-axis and the liquid surface of molten silicon is set as $d_0$, and the height of the liquid surface of the molten silicon is the maximum measurable value. The height of the liquid surface of molten silicon may decrease, and when the emitted laser reaches the uppermost end of the reflective surface of the curved minor 11 after being reflected from the liquid surface of molten silicon, the current height of the liquid surface of molten silicon is the minimum measurable value. The difference between the maximum value and the minimum value of the height of the liquid surface of molten silicon is the detectable range r. When the height of the liquid surface of molten silicon is changed from high to low, the reflecting points of the laser on the liquid surface of molten silicon are set as $V_0(T_0,D_0)$, $V_1(T_1,D_1)$, . . . , $V_i(T_i,D_i)$ in sequence, and the lines formed by the reflection of the liquid surface of molten silicon are set as $f_0, f_1, \ldots, f_i$ in sequence. The curve function of the reflective surface of the curved mirror 11 is set as $y=f(x)$. The reflecting points on the curved minor 11 are set as $C_0(x_0,y_0)$, $C_1(x_1,y_1)$, . . . , $C_i(x_i,y_i)$ in sequence, the lines formed by the reflection of the curved minor 11 are set as $f_0', f_1', \ldots, f_i'$ in sequence. The angles formed by $f_0', f_1', \ldots, f_i'$ and the x-axis are set as $\alpha_0, \alpha_1, \ldots, \alpha_i$ in sequence. The reflection tangent line of $f_i$ and $f_i'$ at the point $C_i(x_i,y_i)$ is set as $l_i$. The laser is finally incident on the CCD sensor 12 which is disposed vertically. The line representing the CCD sensor 12 is set as $x=L+m_0$. The incident points on the CCD sensor 12 are set as $P_0(L+m_0,Q_0)$, $P_1(L+m_0,Q1)$, . . . , $P_i(L+m_0,Q_i)$ in sequence.

The coordinates of the laser incident points and the incident angle $\beta$ are known, the detectable range r of the change in the liquid surface of molten silicon and the height range R of the reflected laser displayed on the CCD sensor are known, the magnification is $N=R/r$, and the position coordinates of respective incident points on the CCD sensor may be read directly, therefore, in the method for detecting a position of a liquid surface of the present invention, the changes in the height of the liquid surface of molten silicon may be detected only in the case that the curve function and the position of the reflective surface of the curved minor are given, a curved minor which satisfies the curve function of the reflective surface is then prepared, and the curved mirror is finally placed within the CCD detecting device. The numerical algorithm for the curve function of the reflective surface of the curved minor is given as follows.

Calculation of the discrete point $C_i(x_i,y_i)$ in the curve of the curved minor:

First, $l_0$ is obtained using $f_0$ and $f_0'$, according to the optical reflection principle. Since $V_0(T_0,D_0)$ on $f_0$ and the angle $\beta$ are already known, the function of $f_0$ is known, and $C_0(x_0,y_0)$ and $P_0(L+m_0,Q_0)$ may be determined. The reflection tangent line $l_0$ at the intersection point $C_0(x_0,y_0)$ is obtained according to the incident line $f_0$ and the reflected line $f_0'$. When the liquid surface moves downwards by a distance d, that is, the reflecting point of the liquid surface is changed to be $V_1(T_1,D_1)$, it may be calculated that there shall be a point $P_1(L+m_0,Q_1)$ on the CCD sensor. In this case, the intersection point of lines $l_0$ and $f_1$ is obtained as $C_1(x_1,y_1)$, a line $f_1'$ is obtained using points $C_1(x_1,y_1)$ and $P_1(L+m_0,Q_1)$, and then the reflection tangent line $l_1$ at the intersection point $C_1(x_1,y_1)$ of lines $f_1$ and $f_1'$ is obtained using lines $f_1$ and $f_1'$, according to the optical reflection principle. At this time, $C_1(x_1,y_1)$ is obtained through $C_0(x_0,y_0)$, and in turns, using the iterative method, the intersection point of $l_{i-1}$ and $f_i$ is set as $C_i(x_i,y_i)$, a line $f_i'$ is obtained using the points $C_i(x_i,y_i)$ and $P_i(L+m_0,Q_i)$, and then a line $l_i$ is obtained using $f_i$ and $f_i'$, according to the optical reflection principle, until all the discrete data points $C_i(x_i,y_i)$ (wherein i=0, 1, 2, . . . , n) are obtained.

Polynomial curve fitting is performed by using the obtained discrete data points $C_i(x_i,y_i)$ as follows:

An M-order polynomial curve fitting is performed using the discrete data points $C_i(x_i,y_i)$ obtained by the above calculation, the fitted polynomial curve of the curved mirror is as follows:

$$y=f(x)=\alpha_M x^M+\alpha_{M-1}x^{M-1}+\ldots+\alpha_0$$

Wherein x is a value selected from a range $(x_0,x_n)$, M is a value selected from a range 3-5, and $\alpha_0, \alpha_1, \ldots, \alpha_M$ are the parameters given by the least squares curve fitting algorithm. The least squares curve fitting algorithm is a general mathematical algorithm, and therefore no further explanation is provided here.

Step 3

According to the polynomial curve function of the curved minor calculated in step 2, the curved mirror 11 is prepared, such that the radian function of the reflective surface of the curved minor 11 is consistent with the polynomial curve function of the curved mirror. Next, the curved minor 11 is disposed within the CCD detecting device 4, such that the reflective surface of the curved mirror 11 is disposed obliquely, and the reflective surface faces the optical filter 9 and the CCD sensor 12, the position of the curved mirror 11 within the CCD detecting device 4 may be determined by the values defined by the polynomial curve function of the curved minor obtained as above.

Step 4

The laser device 3 is activated, and the laser is emitted from the laser incident point of the laser device 3 towards the liquid surface of molten silicon. The laser enters into the CCD detecting device 4 after being reflecting from the liquid surface of molten silicon, and therefore, the change in the height of the liquid surface of molten silicon may be detected by the CCD sensor 12.

The detailed detecting processes of the change in the height of the liquid surface of molten silicon are as follows. Since the maximum variable range r of the height of the molten silicon liquid surface is known and the maximum measureable range R of the spot on the CCD sensor 12 is known, the magnification of the curved minor 11 may be obtain as N=R/r. The spot on the CCD sensor 12 is changed as the liquid level of the liquid surface of molten silicon is changed. The changed value of the height of the spot on the CCD sensor 12 is recorded, and then is divided by the magnification N, so that the changed value of the height of the liquid surface of molten silicon may be obtained.

Embodiments

In the example of a laser triangulation liquid level detection system for a single crystal furnace, wherein the height parameter of the initial liquid surface is $d_0$=1300 mm, the respective parameters in steps 1 and 2 are set as follows, according to the above liquid surface position detection method: the laser incident point is set as $m_0$=300 mm, the height parameter of the initial liquid surface is set as $d_0$=1300 mm, the distance from the start point of the curved mirror to the CCD sensor is set as L=300 mm, the detectable range is set as r=40 mm, and the displayable range of the CCD sensor is set as R=75 mm. In order to facilitate the calculation, the curved minor $C_0(x_0,y_0)$ is assumed as being on the x-axis, that is, $C_0(m_0,0)$, and a iterative calculation is performed according to the calculation method of the discrete points $C_i(x_i,y_i)$ of the curve of the curved mirror, wherein the displacement variation step is set as d=0.01 mm, and therefore, all the discrete data points $C_i(x_i,y_i)$ (wherein i=0, 1, 2, . . . , n) may be calculated.

An M-order polynomial curve fitting (wherein M=3) is performed using the discrete data points $C_i(x_i,y_i)$ obtained by the above calculation, and the fitted polynomial curve function of the curved minor is as follows:

$$y = -1023.29960 + 6.30977x - 0.01135x^2 + 0.0000056x^3$$

$$x \in [300, 323.14]$$

The linear magnification is N=1.875

At last, a linear magnifying curved mirror having the above curve function may be prepared according to steps 3 and 4, and the location to be disposed may be determined by said function. The changed height value displayed on the CCD sensor is divided by the linear magnification N, so as to obtain the changed value of the actual height of the liquid surface.

What is claimed is:

1. A device to detect a liquid level of molten silicon, comprising:
    a charged-coupled device (CCD) detector comprising
        a housing,
        an optical filter horizontally disposed at a bottom of the housing,
        a driving board vertically disposed at an inner wall of the housing,
        a CCD sensor vertically disposed at an inner side of the driving board,
        a curved mirror having a concave reflective surface disposed within the housing, and
        a connector disposed at a top of the housing, wherein the reflective surface of the curved mirror is disposed obliquely, and the reflective surface faces the optical filter and the CCD sensor, wherein the curved mirror is configured to bounce an input laser beam from a surface of molten silicon onto the CCD sensor so that a change in a height of the surface and a corresponding incident point on the CCD sensor have a linear relationship;
    a signal processing device disposed within the CCD detector;
    openings disposed at a top of a crystal furnace;
    gold-plated quartz glasses disposed at the openings; and
    a laser device and a CCD detecting device respectively disposed at the openings.

2. The device of claim 1, wherein a change in a height of the surface is magnified by a ratio of a detectable range of the corresponding incidental point on the CCD sensor to the detectable range of the change in the height of the surface.

3. A liquid level detection method using a laser beam reflected from a curved mirror, comprising:
    generating a laser beam directed onto a surface of molten silicon;
    bouncing the laser beam reflected from the surface onto a CCD sensor using a curved mirror;
    detecting an incident point on the CCD sensor where the bounced laser beam reaches, and
    calculating a change in a height of the surface using a polynomial curve fitting formula, wherein the formula is based on values of discrete data points on the curved mirror premeasured at different levels of the surface and values of responsive data points on the CCD sensor corresponding to the data points on the curved mirror.

4. The liquid level detection method of claim 3, wherein the curved mirror magnifies a change in a height of the surface by a ratio of a detectable range of an incidental point on the CCD sensor to a detectable range of the change in the height of the surface.

* * * * *